(12) United States Patent
Salter et al.

(10) Patent No.: US 12,172,603 B2
(45) Date of Patent: Dec. 24, 2024

(54) SYSTEMS FOR ACCESSING CARGO SPACES ON VEHICLES EQUIPPED WITH A TAILGATE ASSEMBLY

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Dawn Piechocki, Grosse Pointe Park, MI (US); Dennis Yee, Milford, MI (US); Darshan Arun Nayak, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/460,865

(22) Filed: Sep. 5, 2023

(65) Prior Publication Data
US 2023/0406212 A1 Dec. 21, 2023

Related U.S. Application Data

(62) Division of application No. 17/367,756, filed on Jul. 6, 2021, now Pat. No. 11,780,373.

(51) Int. Cl.
*B60R 3/02* (2006.01)
*B62D 33/03* (2006.01)

(52) U.S. Cl.
CPC .............. *B60R 3/02* (2013.01); *B62D 33/03* (2013.01)

(58) Field of Classification Search
CPC ..... B62D 33/03; B62D 33/0273; B62D 33/00
USPC .................................... 296/62; 280/166, 169
See application file for complete search history.

(56) References Cited

U.S. PATENT DOCUMENTS

| 3,266,594 | A | * | 8/1966 | Antosh | B60R 3/00 |
| | | | | | 280/166 |
| 5,205,603 | A | | 4/1993 | Burdette, Jr. | |
| 5,738,362 | A | * | 4/1998 | Ludwick | B60R 3/02 |
| | | | | | 280/166 |
| 6,170,843 | B1 | * | 1/2001 | Maxwell | B60R 3/02 |
| | | | | | 280/166 |
| 6,237,927 | B1 | * | 5/2001 | Debo | B60R 3/02 |
| | | | | | 280/166 |
| 6,511,086 | B2 | * | 1/2003 | Schlicht | B60R 3/02 |
| | | | | | 280/166 |
| 6,530,588 | B1 | * | 3/2003 | Varney | B60R 3/02 |
| | | | | | 280/505 |
| 6,769,704 | B2 | * | 8/2004 | Cipolla | B60R 3/007 |
| | | | | | 224/521 |

(Continued)

FOREIGN PATENT DOCUMENTS

CN  112498244 A  3/2021

*Primary Examiner* — Amy R Weisberg
*Assistant Examiner* — Veronica M Shull
(74) *Attorney, Agent, or Firm* — Vichit Chea; Carlson, Gaskey & Olds, P.C.

(57) ABSTRACT

Various vehicle systems are proposed for accessing and utilizing vehicle cargo spaces on vehicles equipped with a tailgate assembly. The vehicle systems may include deployable and/or rotatable stairgate systems, deployable step systems, etc. designed for the accessing the vehicle cargo spaces. The proposed systems may include various deployment mechanisms that enable the stairgate/step systems to slide, pivot, rotate, swing, and/or otherwise adjust for providing ease of access and increased flexibility when stepping up to access the vehicle cargo space.

18 Claims, 9 Drawing Sheets

(56) References Cited

U.S. PATENT DOCUMENTS

| | | | |
|---|---|---|---|
| 6,994,362 B2 * | 2/2006 | Foster | B60R 3/005 |
| | | | 280/166 |
| 6,994,363 B2 | 2/2006 | Seksaria et al. | |
| 7,185,904 B1 * | 3/2007 | Jones | B60R 9/06 |
| | | | 280/166 |
| 7,195,262 B2 * | 3/2007 | Chaudoin | B60R 3/007 |
| | | | 280/169 |
| 7,472,938 B2 | 1/2009 | Firzlaff et al. | |
| 7,490,889 B1 * | 2/2009 | Scoggins | B60R 3/007 |
| | | | 280/166 |
| 7,503,572 B2 * | 3/2009 | Park | B60R 3/02 |
| | | | 280/165 |
| 7,635,247 B2 * | 12/2009 | Collins | B60R 3/02 |
| | | | 414/462 |
| 7,661,693 B1 * | 2/2010 | Lipski | B60R 9/06 |
| | | | 280/166 |
| 7,712,811 B2 | 5/2010 | Heaman et al. | |
| 8,182,013 B1 | 5/2012 | Alvarado | |
| 8,201,869 B1 | 6/2012 | Butlin, Jr. et al. | |
| 8,251,387 B2 * | 8/2012 | Gansberger | B60R 3/007 |
| | | | 280/166 |
| 8,366,129 B2 * | 2/2013 | Salmon | B60R 3/02 |
| | | | 280/166 |
| 8,664,624 B2 | 3/2014 | Kingsley et al. | |
| 9,994,263 B1 | 6/2018 | Richter | |
| 10,661,842 B2 | 5/2020 | Povinelli et al. | |
| 2010/0230209 A1 | 9/2010 | Hughes et al. | |
| 2015/0291086 A1 | 10/2015 | Salter et al. | |
| 2018/0043831 A1 | 2/2018 | Stojkovic et al. | |
| 2018/0065560 A1 | 3/2018 | Krishnan et al. | |
| 2018/0072242 A1 | 3/2018 | Spahn et al. | |
| 2019/0389388 A1 | 12/2019 | Ngo | |
| 2021/0402929 A1 | 12/2021 | Robinson et al. | |

\* cited by examiner

SYSTEMS FOR ACCESSING CARGO SPACES ON VEHICLES EQUIPPED WITH A TAILGATE ASSEMBLY

CROSS-REFERENCE TO RELATED APPLICATIONS

This is a divisional of U.S. patent application Ser. No. 17/367,756, which was filed on Jul. 6, 2021.

TECHNICAL FIELD

This disclosure relates to motor vehicles, and more particularly to systems for accessing and utilizing vehicle cargo spaces on vehicles equipped with a tailgate assembly.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A vehicle system according to an exemplary aspect of the present disclosure includes, among other things, a tailgate structure and a deployable ladder integrated as part of the tailgate structure. The deployable ladder includes a main stair section and an adjustable stair section that is pivotable between a first position and a second position relative to the main stair section. A base section of the adjustable stair section is received in abutting contact with the main stair section in the first position and is displaced from the main stair section in the second position.

In a further non-limiting embodiment of the foregoing vehicle system, a strain gauge and a control module are operably connected. The control module is programmed to command an alert in response to a signal from the strain gauge indicating that an amount of stress on the deployable ladder exceeds a predefined threshold.

In a further non-limiting embodiment of either of the foregoing vehicle systems, a light module is mounted within an internal cavity of the tailgate structure and is configured for illuminating a step of the deployable ladder.

In a further non-limiting embodiment of any of the foregoing vehicle systems, the step includes a long persistence phosphor coating.

In a further non-limiting embodiment of any of the foregoing vehicle systems, a sensor system and a control module are operably connected. The control module is programmed to command an audible alert in response to a signal from the sensor system indicating that a user is approaching the deployable ladder.

In a further non-limiting embodiment of any of the foregoing vehicle systems, a pivoting carrier plate assembly is adapted for rotating the deployable ladder in a multitude of angular positions relative to the tailgate structure.

A vehicle system according to another exemplary aspect of the present disclosure includes, among other things, a hitch tube and a deployable step system mounted to the hitch tube and movable between a stowed position and at least one deployed position. The deployable step system includes a tube assembly and a step pad mounted to the tube assembly.

In a further non-limiting embodiment of the foregoing vehicle system, the hitch tube extends in cross-width direction of a vehicle and is a component of a vehicle body of the vehicle. A trailer hitch may be mounted to the hitch tube.

In a further non-limiting embodiment of either of the foregoing vehicle systems, the deployable step system is mounted outboard of the trailer hitch.

In a further non-limiting embodiment of any of the foregoing vehicle systems, the tube assembly of the deployable step system is pivotably mounted to the hitch tube by a mounting bracket.

In a further non-limiting embodiment of any of the foregoing vehicle systems, the tube assembly is pivotable between the stowed position and a first deployed position. The tube assembly is parallel to a longitudinal axis of a bumper in the stowed position and is traverse to the longitudinal axis in the first deployed position.

In a further non-limiting embodiment of any of the foregoing vehicle systems, the tube assembly is movable in a sweeping path along an angular arc to position the tube assembly in the first deployed position.

In a further non-limiting embodiment of any of the foregoing vehicle systems, the tube assembly is movable from the first deployed position to a second deployed position. An inner tube is moved to an extended position relative to an outer tube of the tube assembly to position the tube assembly in the second deployed position.

In a further non-limiting embodiment of any of the foregoing vehicle systems, the tube assembly includes an outer tube and an inner tube that is configured to slide relative to the outer tube. The step pad is mounted to the inner tube.

A vehicle system according to another exemplary aspect of the present disclosure includes, among other things, a tailgate structure and a deployable step system integrated as part of the tailgate structure and movable between a stowed position and a deployed position relative to an inner cavity of the tailgate structure. In the stowed position, a step pad of the deployable step system establishes a cover molding section of the tailgate structure. In the deployed position, the step pad is rearward and vertically lower than the tailgate structure.

In a further non-limiting embodiment of the foregoing vehicle system, the deployable step system includes the step pad, a support tube, an extension tube, and a deployment tube.

In a further non-limiting embodiment of either of the foregoing vehicle systems, the support tube is mounted to the tailgate structure and the extension tube is movably received within a passageway established by the support tube.

In a further non-limiting embodiment of any of the foregoing vehicle systems, the deployment tube is pivotably connected to the extension tube.

In a further non-limiting embodiment of any of the foregoing vehicle systems, an extension of the extension tube outside of the passageway positions the step pad rearward of the tailgate structure. A pivoting of the deployment tube relative to the extension tube positions the step pad vertically lower than the tailgate structure.

In a further non-limiting embodiment of any of the foregoing vehicle systems, a lower outer surface of the step pad establishes the cover molding section, and an upper outer surface of the step pad establishes a step surface of the step pad.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
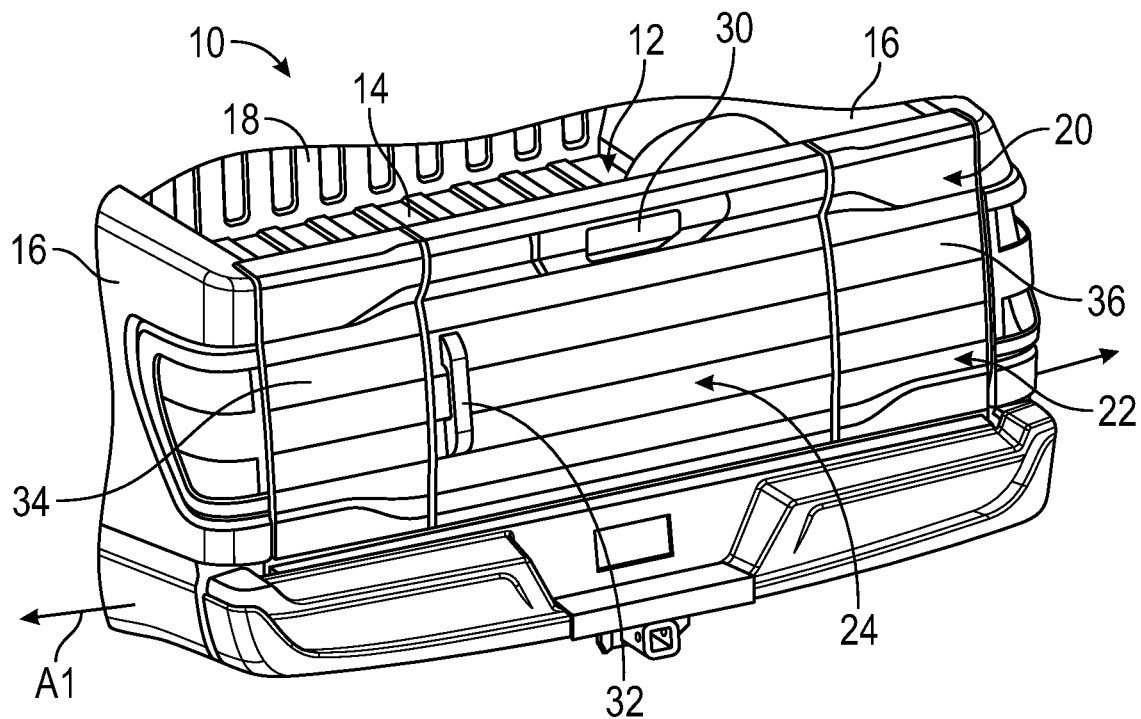
FIG. 1 is a rear perspective view of a motor vehicle equipped with a cargo space and a tailgate assembly positioned in a tailgate closed position relative to the cargo space.

This disclosure details various vehicle systems for accessing and utilizing vehicle cargo spaces on vehicles equipped with a tailgate assembly. The vehicle systems may include deployable and/or rotatable stairgate systems, deployable step systems, etc. designed for the accessing the vehicle cargo spaces. The proposed vehicle systems may include various deployment mechanisms that enable the deployable stairgate/step systems to slide, pivot, rotate, swing, and/or otherwise adjust for providing ease of access and increased flexibility when stepping up to access the vehicle cargo space. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 could be configured as a one-piece tailgate structure or a multi-sectional tailgate structure. The tailgate assembly 20 may include, among other things, a frame subassembly 22 and, optionally, a door subassembly 24. The door subassembly 24 may sometimes be referred to as a "swing gate subassembly." Although the door subassembly 24 is shown, the teachings of this disclosure are not limited to tailgate assemblies that include swing gate subassemblies. Rather, the teachings of this disclosure could be used with any type of tailgate.

The frame subassembly 22 may include a driver side section 34, a passenger side section 36, and a connection member 38 (see FIG. 3) connected between the driver side section 34 and the passenger side section 36. If provided, the door subassembly 24 may be connected to either the driver side section 34 or the passenger side section 36 by a hinge assembly 35 (see FIG. 3).

Figure 2:
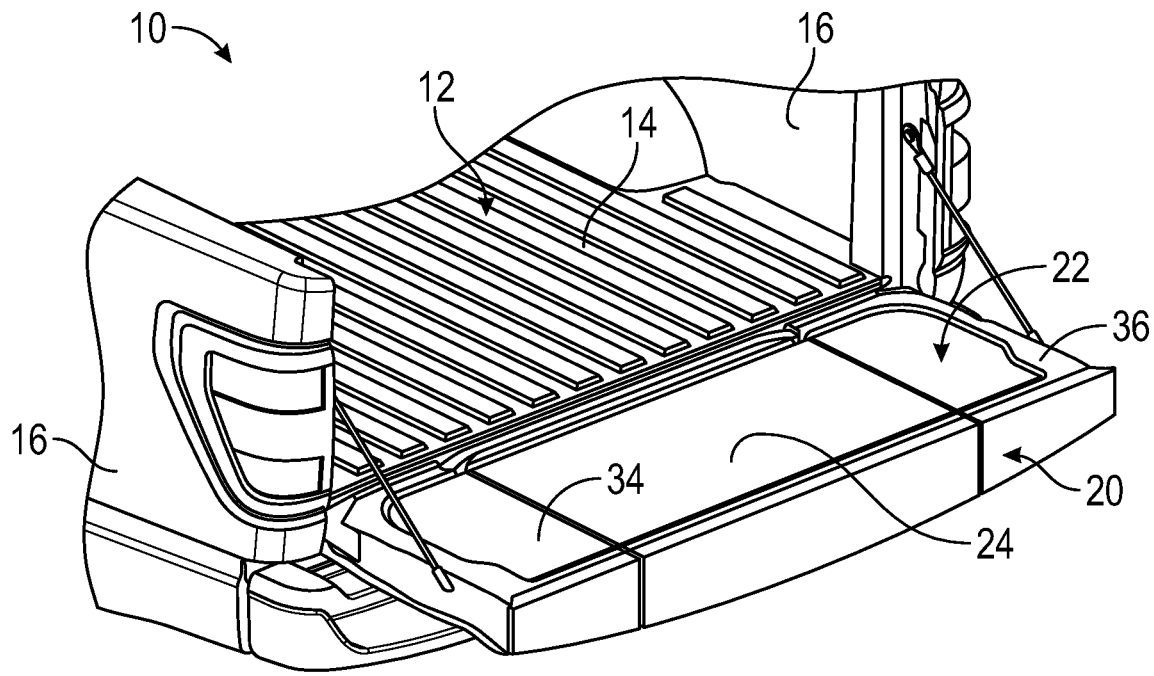
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

If provided, the door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
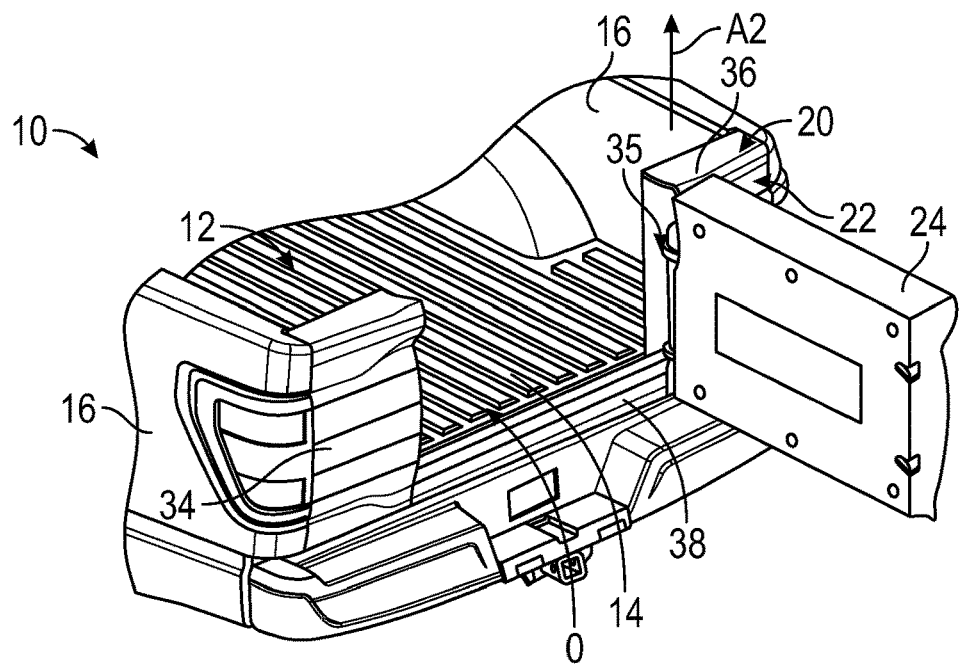
FIG. 3 illustrates a door subassembly of the tailgate assembly of FIG. 1 in a door open position.
Figure 4:
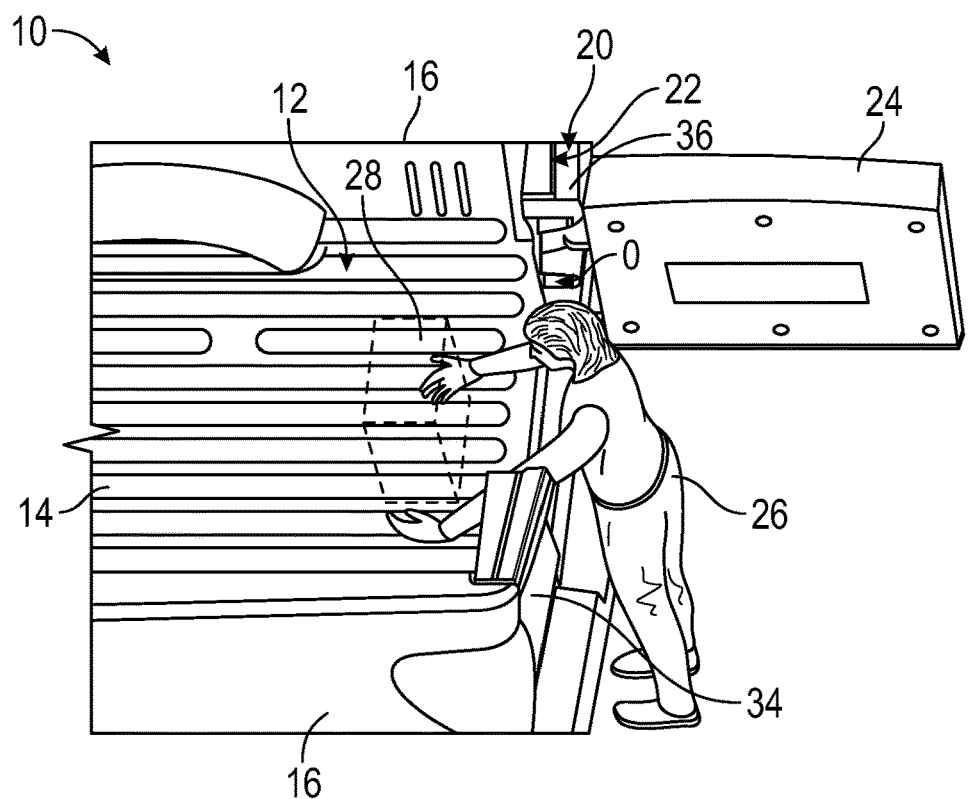
FIG. 4 is a rear and top view of the tailgate assembly and the door subassembly of FIG. 3.

When in the tailgate closed position, the door subassembly 24 may be pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, if the tailgate assembly 20 were moved to the tailgate open position of FIG. 2. The cargo bed access opening O can also provide clearance for the user 26 to enter the cargo bed 12 to either load or retrieve an item of cargo 28 (see FIG. 4).

The user 26 may require assistance for stepping up and accessing the cargo bed 12 from the ground. This disclosure is therefore directed to systems for enabling improved access to the cargo bed 12.

Figure 5:
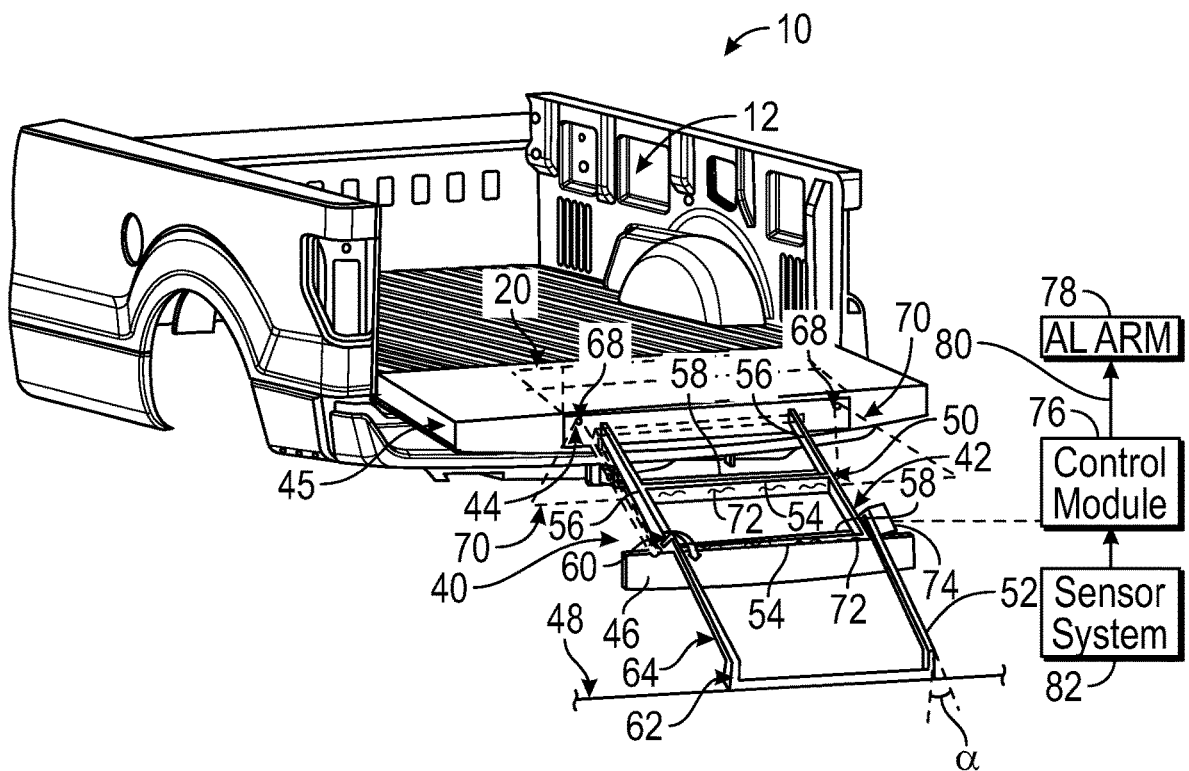
FIG. 5 illustrates a deployable stairgate system for accessing a vehicle cargo space.
Figure 6A:
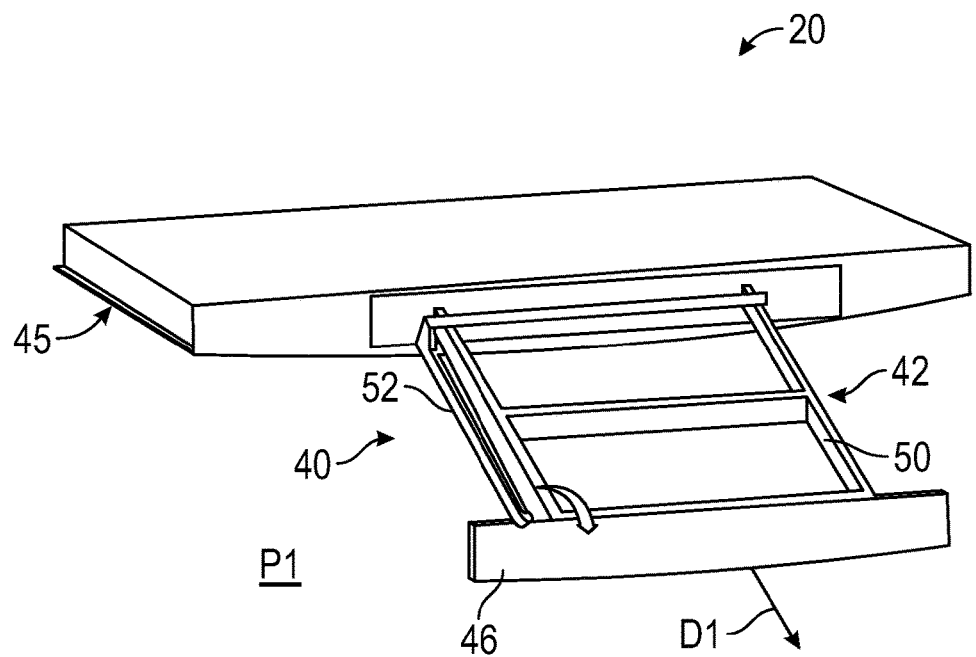
FIGS. 6A and 6B schematically illustrate movement of the deployable stairgate system of FIG. 5 between first and second deployed positions.
Figure 6B:
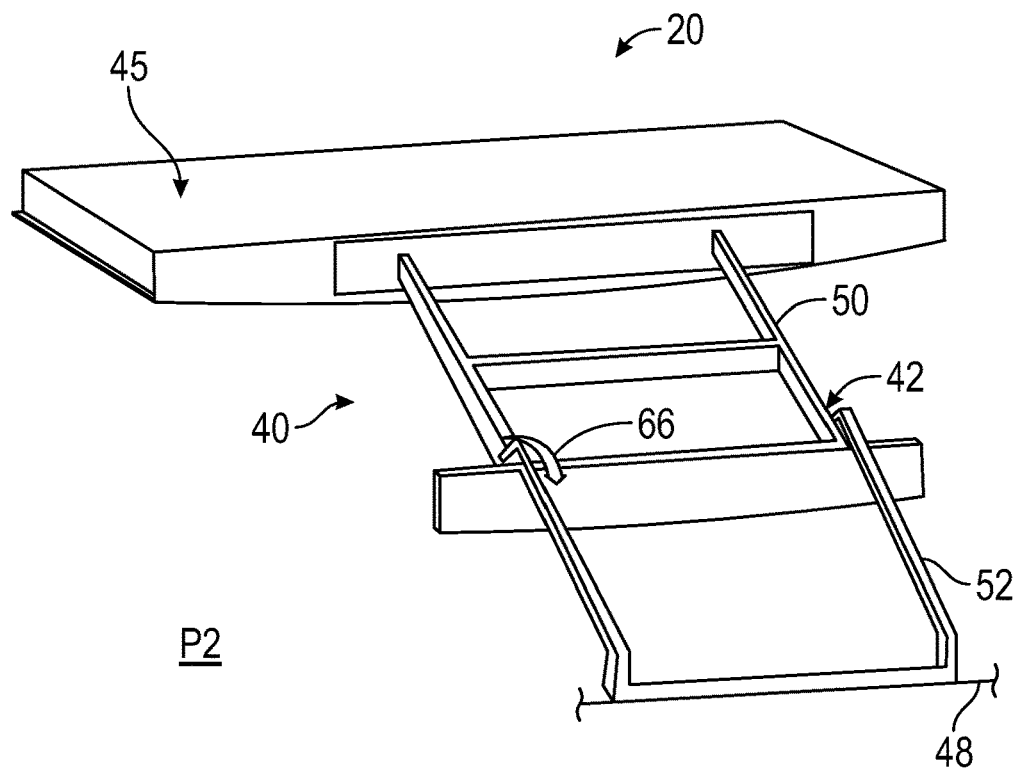

FIGS. 5, 6A, and 6B illustrate a deployable stairgate system 40 that can be utilized in connection with a vehicle tailgate assembly, such as the tailgate assembly 20 of the vehicle 10 of FIGS. 1-4, for example. The deployable stairgate system 40 may be configured for assisting the user in accessing the cargo bed 12 when the tailgate assembly 20 is moved to the tailgate open position.

In this embodiment, the deployable stairgate system 40 is integrated as part of a tailgate structure 45 of the tailgate assembly 20. The tailgate structure 45 may be a one-piece construction or a multi-sectional construction, such as for providing a door subassembly, for example.

The deployable stairgate system 40 may include a deployable ladder 42 that is movably connected to the tailgate structure 45. The deployable stairgate system 40 is movable between a stowed position (shown in phantom in FIG. 5) in which the deployable ladder 42 is housed within an internal cavity 44 of the tailgate structure 45 and a deployed position in which the deployable ladder 42 is extended outside of the internal cavity 44. In the stowed position, a cover molding section 46 of the tailgate structure 45 is positioned in engagement with the remaining portions of the tailgate structure 45 to conceal the deployable ladder 42 inside the internal cavity 44. In the deployed position, the cover molding section 46, which is mounted to a portion of the deployable ladder 42, is moved away from the remaining portions of the tailgate structure 45 to position the deployable ladder 42 relative to a ground surface 48 beneath the tailgate assembly 20.

The deployable ladder 42 may include a main stair section 50 and an adjustable stair section 52. The cover molding section 46 may be mounted to the main stair section 50, and the adjustable stair section 52 may be movably connected to the main stair section 50.

The main stair section 50 may include one or more steps 54 that extend between outer frame sections 56. Each step 54 may include a tread 58 configured for providing a more stable surface for the user to step on when using the deployable ladder 42.

The adjustable stair section 52 may include a pivoting section 60, a base section 62, and a frame section 64 that extends between the pivoting section 60 and the frame section 64. The pivoting section 60 may be pivotably connected to the outer frame sections 56 of the main stair section 50. The base section 62 may be moved between a first position in which the base section 62 is received in abutting contact with the outer frame sections 56 and a second position in which the base section 62 is displaced from the main stair section 50. The second position may be displaced from the first position by about 180 degrees, although other angle ranges are also contemplated within the scope of this disclosure.

In an embodiment, the base section 62 may extend at an angle α relative to the frame section 64. The angle α is configured to allow the adjustable stair section 52 to be received in a low profile manner against the main stair section 50 before its deployment and to provide a more stable surface relative to the ground surface 48 upon its deployment.

The deployable ladder 42 described above may be deployed from the stowed position to the fully deployed position in the following manner. First, by manipulating (e.g., pulling) the cover molding section 46 in a direction D1, the main stair section 50 may be slid or otherwise moved to a first deployed position P1 shown in FIG. 6A. Subsequently, the adjustable stair section 52 may be pivoted in the direction of arrow 66 to position the adjustable stair section 52 in a second deployed position P2 shown in FIG. 6B relative to the main stair section 50. In the second deployed position P2, the base section 62 of the adjustable stair section 52 may be positioned in contact with the ground surface 48. The deployable ladder 42 is considered fully deployed once the adjustable stair section 52 is moved to the second deployed position P2. The user may then use the deployable ladder 42 for accessing the cargo bed 12.

The deployable stairgate system 40 may additionally include one or more light modules 68 that are configured to emit light. Each lighting module 68 may be mounted within the internal cavity 44 and may include one or more light sources, such as LEDs.

When the deployable ladder 42 is fully deployed, each lighting module 68 may emit light (shown schematically at reference numeral 70) for illuminating portions of the deployable ladder 42, such as the steps 54, for example. In an embodiment, each step 54 may be provided with a long persistence phosphor coating 72 that allows the steps 54 to glow even when the lighting modules 68 are no longer illuminated, thereby providing improved nighttime visibility for the user to use the deployable ladder 42.

The deployable stairgate system 40 may further include a strain gauge 74 a control module 76 that are operably connected to one another. The strain gauge 74 may be mounted to any portion of either the main stair section 50 or the adjustable stair section 52 and is configured to monitor an amount of stress being applied to the deployable ladder 42, such as while a user is stepping on the deployable ladder 42 and thus applying a force thereto.

In an embodiment, the control module 76 is programmed to automatically command an alarm 78 when an amount of stress being applied to the deployable ladder 42 exceeds a predefined threshold. For example, in response to input signals from the strain gauge 74, the control module 76 may determine whether the predefined threshold has been exceeded and may communicate a command signal 80 to the alarm 78 for alerting the user of the overstress conditions. The command signal 80 instructs the alarm 78 to produce the alert for indicating the potential overstress situation to a user. The alert may be in the form of an audible alert, such as an alert produced by a sound exciter mounted on the vehicle 10, a message displayed on a human machine interface of the vehicle 10, a message displayed on a personal electronic device (e.g., a smart phone) of the operator of the vehicle 10, etc.

The amount of stress experienced by the deployable ladder 42 may vary with the position of the deployable ladder 42 relative to the tailgate assembly 20. Therefore, a lookup table of stress versus the distance the deployable ladder 42 is deployed from the tailgate structure 45 may be saved in the memory of the control module 76. The lookup table may be referenced by the control module 76 for determining whether or not the predefined threshold has been exceeded at any given position of deployable ladder 42.

The control module 76 may further be operably connected to a sensor system 82. The sensor system 82 may include a multitude of sensors (e.g., ultrasonic sensors, radar sensors, or both) arranged and configured for monitoring the environment to the rear of the vehicle 10. For example, the sensor system 82 may monitor the environment to the rear of the vehicle 10 for determining when a user is approaching the tailgate assembly 20. If so, the control module 76 may instruct the alarm 78 to produce audible instructions (e.g., "move left," "move right," etc.) for guiding the user into proper alignment relative to the deployable ladder 42 when carrying a large cargo item that could block the user's visibility.

Although schematically illustrated as a single controller, the control module 76 may be part of a vehicle control system that includes a plurality of additional control modules for interfacing with and commanding operation of the various components of the vehicle 10. In an embodiment, the control module 76 is part of a body control module (BCM) of the vehicle 10. However, other configurations are also contemplated.

Figure 7:
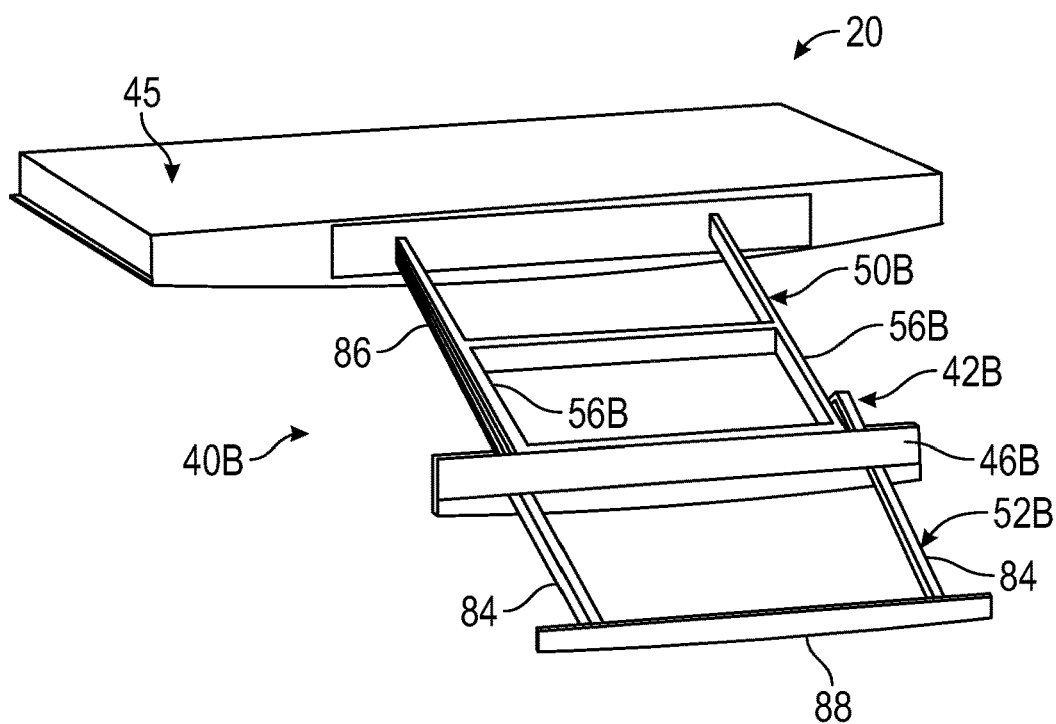
FIG. 7 illustrates another exemplary deployable stairgate system.

FIG. 7 illustrates another exemplary deployable stairgate system 40B. The deployable stairgate system 40B is similar to the deployable stairgate system 40 of FIGS. 5-6B and includes a deployable ladder 42B having a main stair section 50B and an adjustable stair section 52B. However, in this embodiment, rather than being configured to rotate relative to the main stair section 50B, the adjustable stair section 52B may be configured to slide relative to the main stair section 50B.

For example, movement of frame rails 84 of the adjustable stair section 52B may be guided by tracks 86 formed in outer frame sections 56B of the main stair section 50A. The frame rails 84 of the adjustable stair section 52B may be connected to a deployable portion 88 of the cover molding section 46B. The deployable portion 88 may be pulled in a direction away from the remaining portions of the cover molding section 46B to lower the adjustable stair section 52B, thereby positioning the deployable ladder 42B in the fully deployed position.

Although not shown in FIG. 7, the deployable stairgate system 40B could further include the light modules 68, the strain gauge 74, the control module 76, and/or the sensor system 82 shown in FIG. 5.

Figure 8:
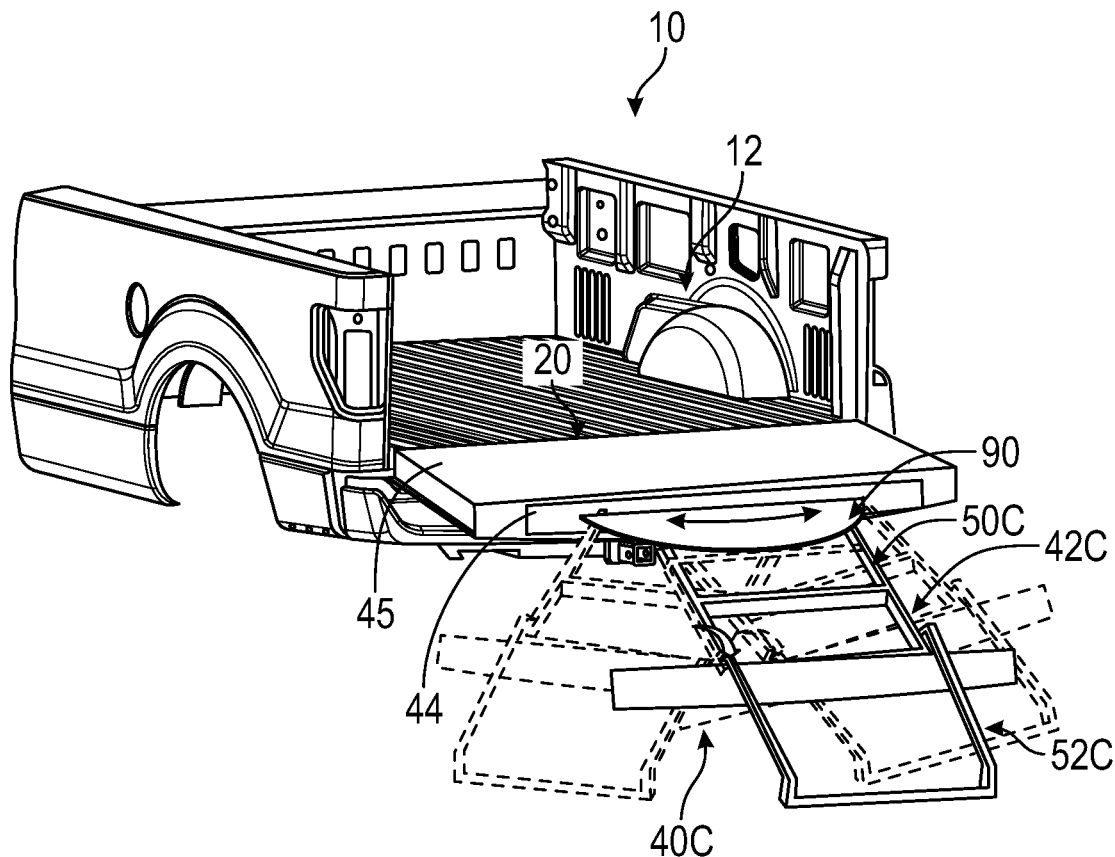
FIG. 8 illustrates yet another exemplary deployable stairgate system.
Figure 9:
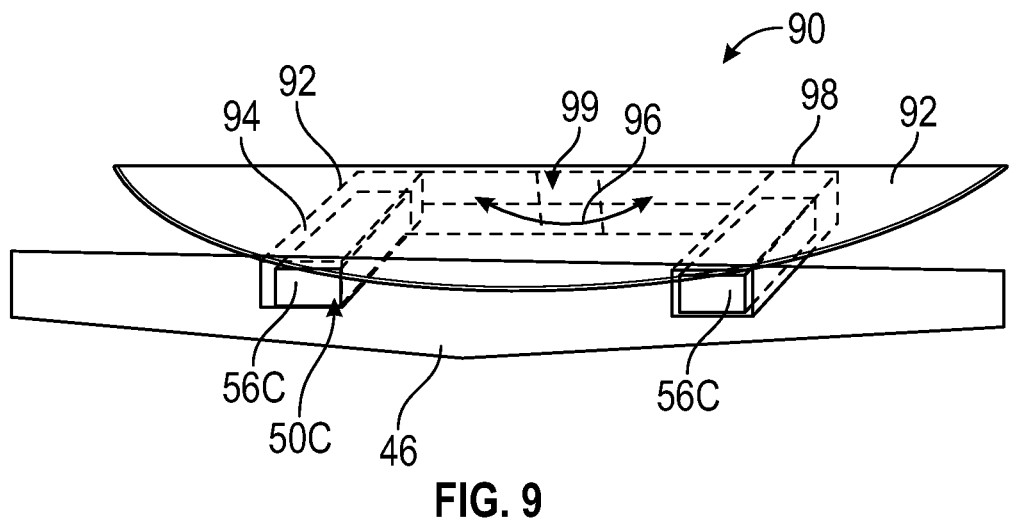
FIG. 9 illustrates exemplary aspects of a pivoting carrier plate assembly of the deployable stairgate system of FIG. 8.

FIGS. 8 and 9 illustrate yet another exemplary deployable stairgate system 40C. The deployable stairgate system 40C is similar to the deployable stairgate system 40 of FIGS. 5-6B and includes a deployable ladder 42C having a main stair section 50C and an adjustable stair section 52C. However, in this embodiment, the deployable ladder 42C may be further configured to rotate, via a pivoting carrier plate assembly 90, in a multitude of angular positions relative to the tailgate structure 45 of the tailgate assembly 20 while in the fully deployed position. Some exemplary angular positions of the deployable ladder 42C are illustrated in phantom lines in FIG. 8, although various other positions could also be achieved within the scope of this disclosure. The ability to rotate the position of the deployable ladder 42C to adjust the location of its entry point allows for misalignment of the vehicle 10 relative to the desired load position, thereby improving convenience to the user.

Further details of the pivoting carrier plate assembly 90 are illustrated with primary reference to FIG. 9. The pivoting carrier plate assembly 90 may include a carrier plate 92 having internal passages 94 for accommodating outer frame sections 56C of the main stair section 50C. The outer frame sections 56C may slide within the internal passages 94 for deploying the main stair section 50C from the internal cavity 44 of the tailgate structure 45.

The carrier plate 92 may be mounted to the tailgate structure 45, and the main stair section 50C may be pivotally mounted to the carrier plate 92 via a pivot pin 99. The deployable ladder 42C may pivot (schematically shown at arrow 96) about the pivot pin 99 to change the angular position relative to the tailgate structure 45. In an embodiment, the carrier plate 92 may rotate in unison with the main stair section 50C. However, other implementations are also contemplated.

The carrier plate 92 may include a relatively flat upper surface 98. The flat upper surface 98 is configured to provide a stable transitional step surface for a user to step upon when using the deployable ladder 42C to gain access to the cargo bed 12.

Although not shown in FIGS. 8-9, the deployable stairgate system 40C could further include the light modules 68, the strain gauge 74, the control module 76, and/or the sensor system 82 shown in FIG. 5.

FIGS. 10, 11, 12, and 13 illustrate a deployable step system 100 that can be utilized on a motor vehicle, such as the vehicle 10 of FIGS. 1-4, for example. The deployable step system 100 may be configured for assisting the user in accessing the cargo bed 12 whether or not the tailgate assembly 20 is in the tailgate closed position shown in FIG. 1 or the tailgate open position shown in FIG. 2, thereby providing increased utility.

The deployable step system 100 may include a tube assembly 102 and a step pad 104 mounted to the tube assembly 102. The tube assembly 102 may be mounted to a hitch tube 106 (e.g., either directly or via a separate mounting bracket 108, best shown in FIG. 11) of the vehicle 10. The hitch tube 106 is an integral component of a vehicle body of the vehicle 10 and supports a bumper 126. The hitch tube 106 extends in cross-width direction of the vehicle 10, and in an embodiment, extends across a majority of the width of the vehicle 10.

The hitch tube 106 may support a trailer hitch 110 of the vehicle 10. The trailer hitch 110 may provide a receiver tube adapted to receive another trailer component (e.g., a ball mount) for connecting a trailer to the vehicle 10. The tube assembly 102 may be mounted to the hitch tube 106 at a location that is outboard of the trailer hitch 110.

The tube assembly 102 may include an outer tube 112 and an inner tube 114. The outer tube 112 (or the mounting bracket 108) may be mounted directly to the hitch tube 106. In an embodiment, the outer tube 112 or the mounting bracket 108 may be bolted or welded to a bottom surface 116 of the hitch tube 106.

The tube assembly 102 may be secured to the hitch tube 106 (or the mounting bracket 108) in a manner that provides a pivotable connection therebetween. A mechanical connector, such as a pin, for example, may be employed for achieving the pivotable connection.

The outer tube 112 includes a passageway 118 that is sized and shaped to receive the inner tube 114. The inner tube 114 may be received within the passageway 118 and is movable thereto in a telescoping fashion.

The step pad 104 may be mounted to an end portion 120 of the inner tube 114 that is positioned outside of the passageway 118. When deployed, the step pad 104 provides a step surface for a user to step on to gain access to the cargo bed 12.

The deployable step system 100 may additionally include a first activation button 122 for deploying the deployable step system 100 from its stowed position and a second activation button 124 for deploying the inner tube 114 from the outer tube 112. In an embodiment, the first activation button 122 and the second activation button 124 are located on opposite sides of the tube assembly 102. However, other configurations are also contemplated within the scope of this disclosure. When the deployable step system 100 is in the stowed position shown in FIG. 10, the first and second activation buttons 122, 124 are located below and slightly recessed relative to an exterior surface of the bumper 126 to protect the first and second activation buttons 122, 124 from ricocheting objects (e.g., rocks, stones, debris, etc.) and to reduce the likelihood of inadvertent deployment.

Figure 10:
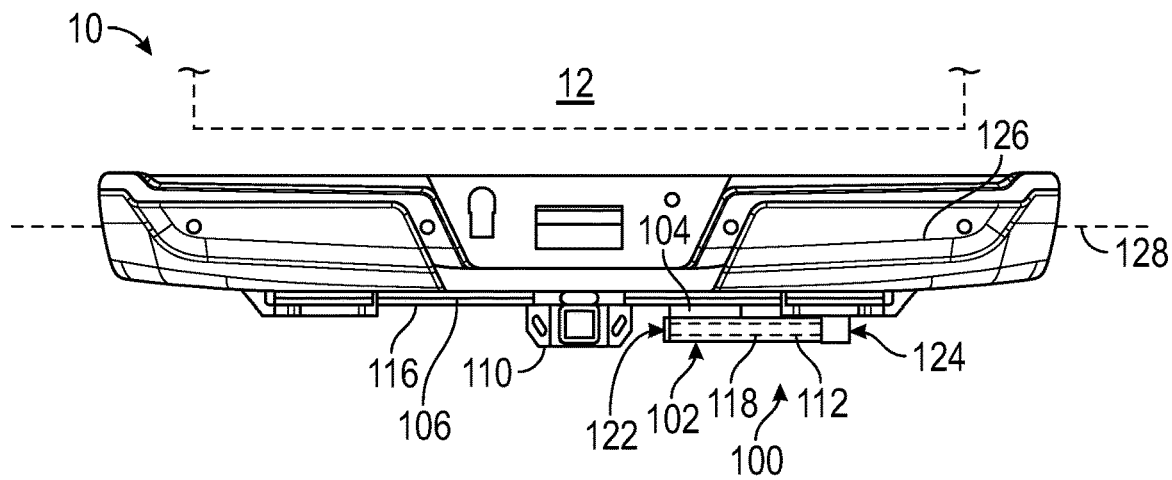
FIG. 10 illustrates a stowed position of a deployable step system for accessing a vehicle cargo space.
Figure 11:
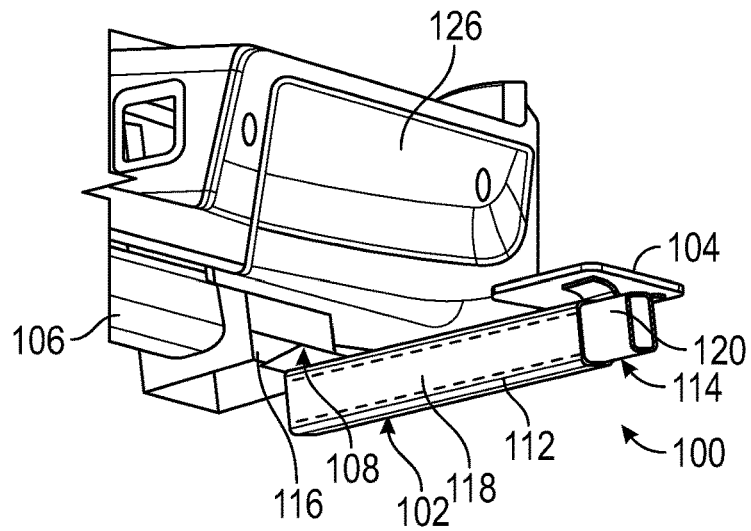
FIG. 11 is a partial view of an underside of the deployable step system of FIG. 10.
Figure 12:
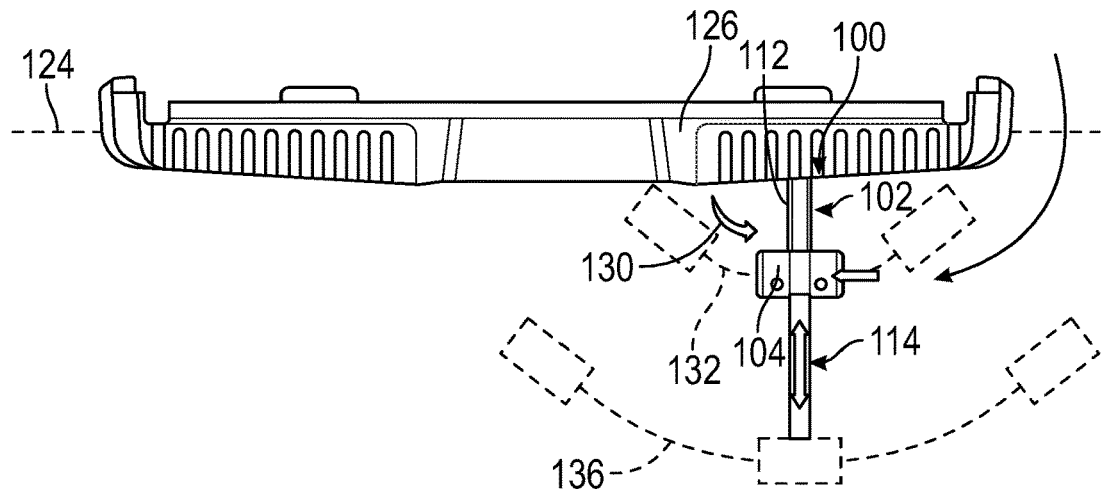
FIG. 12 illustrates a first deployed position of the deployable step system of FIG. 10.

The deployable step system 100 is movable between the stowed position shown in FIG. 10 and a first deployed position shown in FIG. 12. The components of the deployable step system 100 may be manually or automatically moved, such as via a motor and a drive tube, cable, or screw, for example, between the stowed position and the first deployed position.

In the stowed position, the tube assembly 102 is positioned beneath the bumper 126 and extends in parallel with a longitudinal axis 128 of the bumper 126. The step pad 104 is generally not accessible by users in the stowed position.

When the first activation button 122 is pushed, the tube assembly 102 may begin to rotate relative to the hitch tube 106, thereby moving the step pad 104 from the stowed position of FIG. 10 to the first deployed position of FIG. 12. In the first deployed position, the tube assembly 102 is moved to a position that is transverse relative to the longitudinal axis 128 of the bumper 126, thereby moving the step pad 104 in a direction of arrow 130 to a position that is rearward of the bumper 126. The step pad 104 is accessible by users once moved to the first deployed position.

The tube assembly 102/step pad 104 may be moved in a multitude of angular positions relative to the bumper 126 to achieve a desired angular positioning of the first deployed position. For example, the tube assembly 102/step pad 104 may be moved in a sweeping path along an angular arc 132 to position the step pad 104 at various angular positions, some examples of which are illustrated in phantom lines in FIG. 12, although various other positions could also be achieved within the scope of this disclosure.

Figure 13:
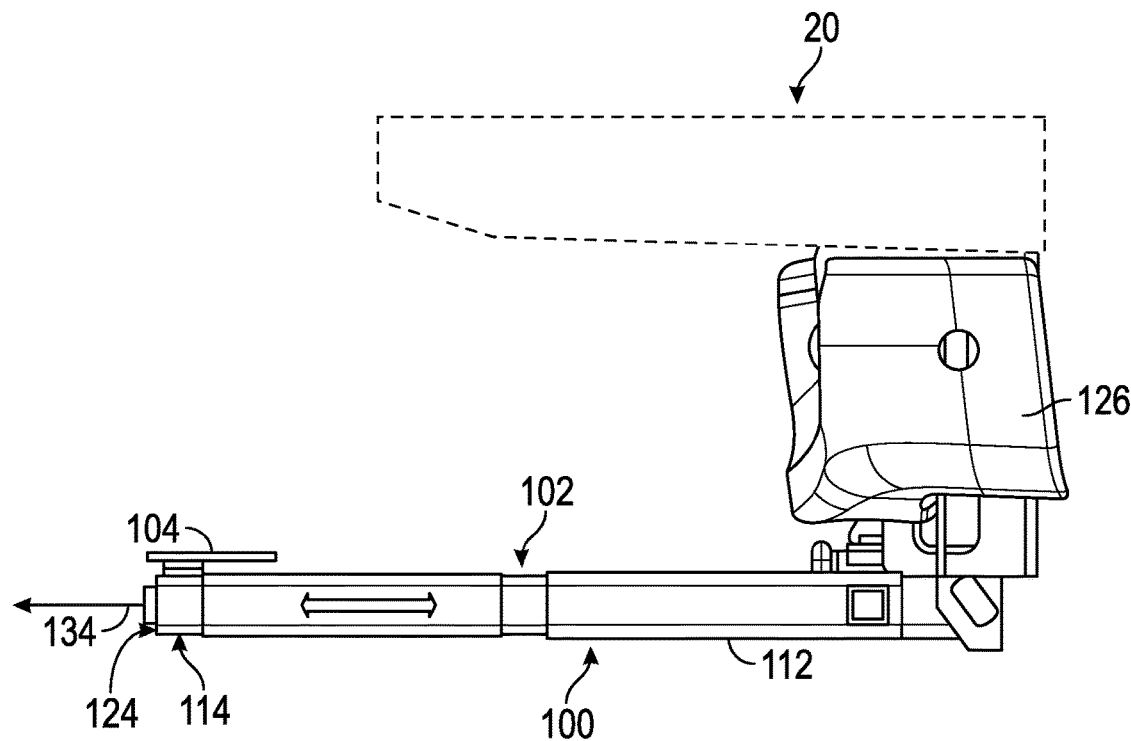
FIG. 13 illustrates a second deployed position of the deployable step system of FIG. 10.

From the first deployed position of FIG. 12, the deployable step system 100 may be further moved to a second deployed position shown in FIG. 13 by actuating the second activation button 124. In the second deployed position, the inner tube 114 may be moved in a direction of arrow 134 relative to the outer tube 112 to its extension limit relative to the outer tube 112 in order to position the step pad 104 further rearward from the bumper 126. The second deployed position may be particularly useful when the tailgate assembly 20 is positioned in the tailgate open position (schematically depicted using phantom lines in FIG. 13).

The tube assembly 102/step pad 104 may be moved in a multitude of angular positions relative to the bumper 126 to achieve a desired angular positioning of the second deployed position. For example, the tube assembly 102/step pad 104 may be moved along an angular arc 136 to position the step pad 104 at various angular positions, some examples of which are illustrated in phantom lines in FIG. 12, although various other positions could also be achieved within the scope of this disclosure. In an embodiment, the angular arc 136 is further rearward of the angular arc 132 relative to the bumper 126 by virtue of having extended the inner tube 114 outward from the outer tube 112.

Figure 14:
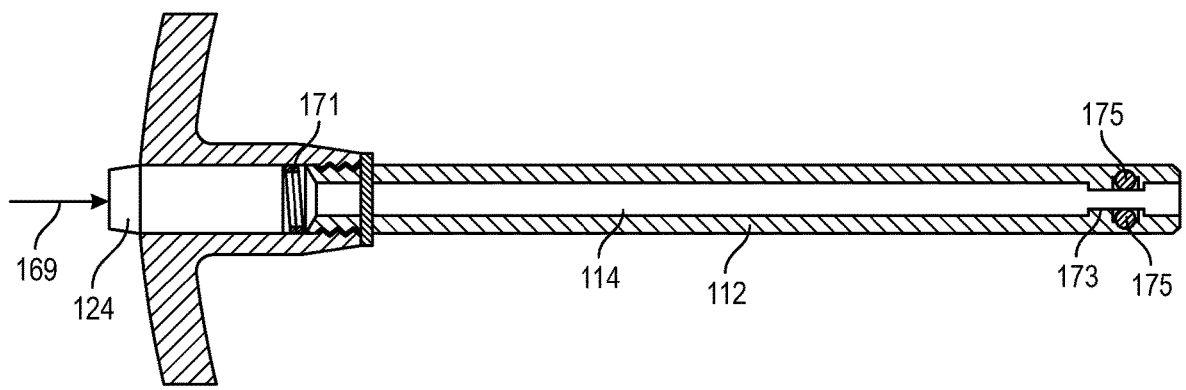
FIG. 14 illustrates a deployment button of the deployable step system of FIG. 10.

FIG. 14 illustrates further details of the functionality of the second activation button 124. The second activation button 124 may be pushed in a direction of arrow 169, thereby forcing a spring 171 to compress. The compressed spring 171 forces the inner tube 114 and the outer tube 112 to align to notches 173 located near ball bearings 175. The ball bearings 175 are therefore permitted to move flush with the outer tube 112, thereby allowing the inner tube 114 to move in the direction of the arrow 134 (see FIG. 13) relative to the outer tube 112.

Although not shown in FIGS. 10-14, the deployable step system 100 could further include features such as the strain gauge 74, the control module 76, and/or the sensor system 82 shown in FIG. 5.

Figure 15:
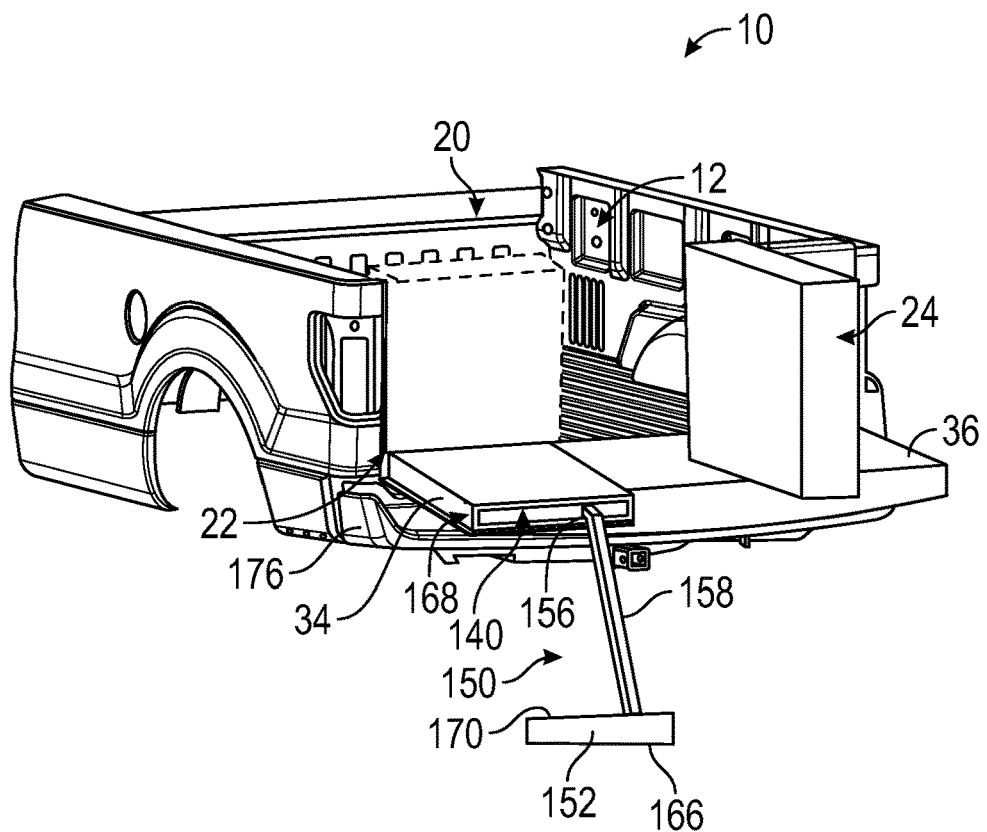
FIG. 15 illustrates another exemplary deployable step system.
Figure 16:
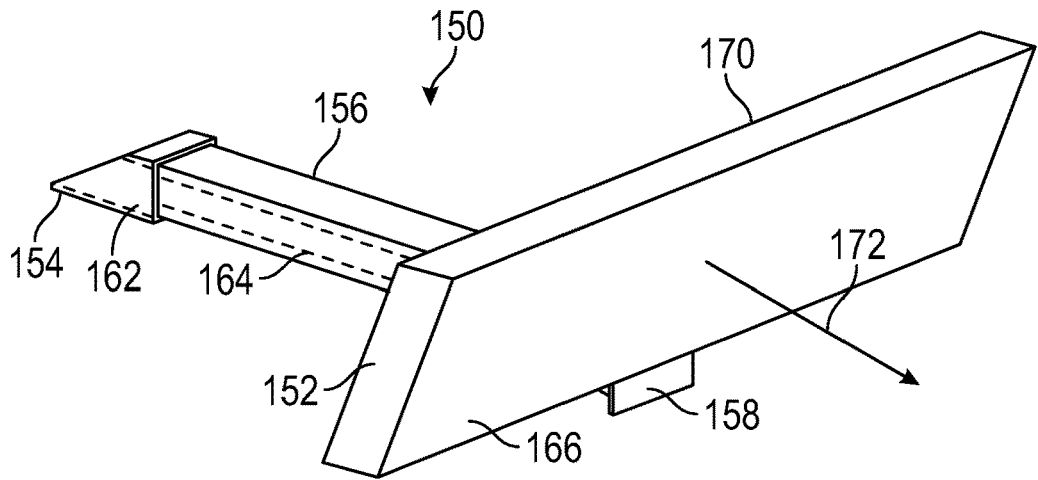
FIG. 16 illustrates a partially deployed position of the deployable step system of FIG. 15.
Figure 17:
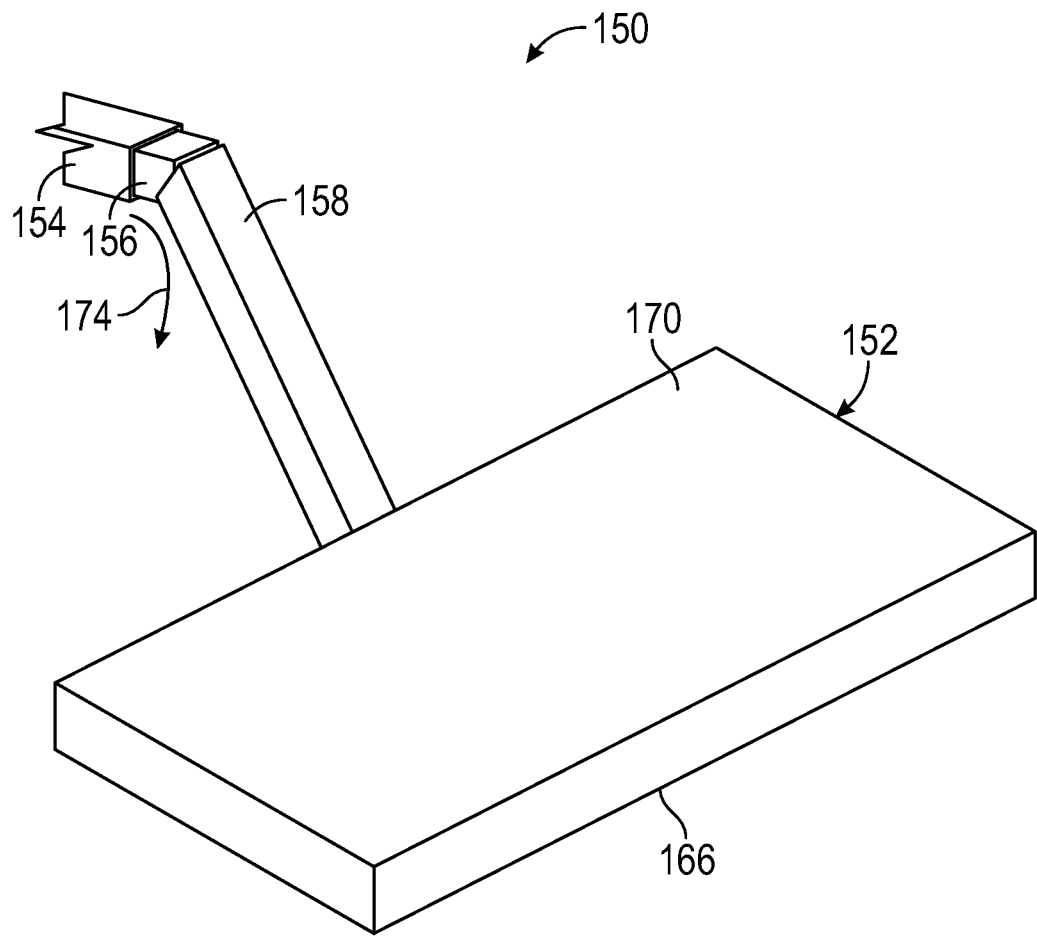
FIG. 17 illustrates a fully deployed position of the deployable step system of FIG. 15.

FIGS. 15-17 illustrate another exemplary deployable step system 150 that can be utilized in connection with a tailgate assembly, such as the tailgate assembly 20 of FIGS. 1-4, for example. The deployable step system 150 is configured for assisting the user in accessing the cargo bed 12 when the tailgate assembly 20 is in the tailgate open position or when the door subassembly 24 of the tailgate assembly 20 is moved to the door open position. The deployable step system 150 could also be integrated as part of a one-piece tailgate structure.

The deployable step system 150 may provide a deployable design that is integrated into the driver side section 34 or the passenger side section 36 of the frame subassembly 22 of the tailgate assembly 20. In another embodiment, two deployable step systems 150 could be provided, with one deployable step system 150 provided within both the driver side section 34 and the passenger side section 36.

The deployable step system 150 may include a step pad 152, a support tube 154, an extension tube 156, and a deployment tube 158. The support tube 154 may be mounted inside an internal cavity 160 of the driver side section 34 or the passenger side section 36. In an embodiment, the support tube 154 is bolted or welded to a surface of the driver side section 34 or the passenger side section 36 that delineates the internal cavity 160.

The support tube 154 includes a passageway 162 that is sized and shaped to receive the extension tube 156 and the deployment tube 158. The deployment tube 158 may be received within a passageway 164 of the extension tube 156 and is movable thereto in a telescoping fashion. Of course, an opposite configuration is also contemplated in which the deployment tube 158 is received over and movable relative to an outer diameter surface of the extension tube 156. As further discussed below, the extension tube 156 may be moved to a position further outside of the support tube 154, and the deployment tube 158 may then be manipulated relative to the extension tube 156 to deploy the step pad 152 to a position that is rearward and vertically lower compared to the tailgate assembly 20.

The deployable step system 150 is movable between a stowed position from inside the internal cavity 160 and the fully deployed position shown in FIG. 15. In the stowed position, a lower outer surface 166 of the step pad 152 establishes a cover molding section 168 of the driver side section 34 or the passenger side section 36. In the deployed position, an upper outer surface 170 of the step pad 152 establishes a step surface for stepping up and into the cargo bed 12.

When the step pad 152 is pulled or otherwise manipulated to release it from the driver side section 34 of the passenger side section 36, the extension tube 156 may begin to move relative to the support tube 154, thereby moving the step pad 152 to a first partially deployed position shown in FIG. 16. In the first partially deployed position, the extension tube 156 is moved to a position that is further rearward of the tailgate assembly 20, thereby moving the step pad 152 in a rearward direction of arrow 172.

From the first partially deployed position of FIG. 16, the deployable step system 150 may be further moved to the fully deployed position of FIG. 17. In order to do so, the deployment tube 158 may be pivoted downwardly in a direction of arrow 174 relative to the extension tube 156 to position the step pad 152 vertically lower than the tailgate assembly 20. In an embodiment, the deployment tube 158 is pivoted by about 45° relative to the extension tube 156, although other deployment angles of extent are also contemplated herein. In the fully deployed position, the upper outer surface 170 of the step pad 152 is moved to a position that is about parallel to a top surface of a bumper 176 (see FIG. 15) of the vehicle 10 and provides a step surface for allowing the user to step up and into the cargo bed 12.

The deployment tube 158 may be mechanically secured to the extension tube 156 for achieving the pivotable connection therebetween. A mechanical connector, such as a pin, for example, may be employed for achieving the pivotable connection.

The systems of this disclosure provide solutions for improving access to and utilization of vehicle cargo spaces. The proposed systems include deployable stairgate or step systems for improving the access to cargo spaces. The proposed systems provide less complex and more cost effective solutions for accessing and utilizing the cargo spaces during both tailgate closed and tailgate open positions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle system, comprising:
a hitch tube; and
a deployable step system mounted to the hitch tube and pivotable between a stowed position and at least one deployed position,
wherein the deployable step system includes a tube assembly and a step pad mounted to an end portion of an inner tube of the tube assembly.

2. The vehicle system as recited in claim 1, wherein the hitch tube extends in cross-width direction of a vehicle and is a component of a vehicle body of the vehicle.

3. The vehicle system as recited in claim 2, comprising a trailer hitch mounted to the hitch tube.

4. The vehicle system as recited in claim 3, wherein the deployable step system is mounted outboard of the trailer hitch.

5. The vehicle system as recited in claim 1, wherein the tube assembly of the deployable step system is pivotably mounted to the hitch tube by a mounting bracket.

6. The vehicle system as recited in claim 1, wherein the tube assembly is parallel to a longitudinal axis of a bumper in the stowed position and is transverse to the longitudinal axis in the at least one deployed position.

7. The vehicle system as recited in claim 6, wherein the tube assembly is movable in a sweeping path along an angular arc to position the tube assembly in the at least one deployed position.

8. The vehicle system as recited in claim 6, wherein the tube assembly is movable from the at least one deployed position to a second deployed position.

9. The vehicle system as recited in claim 8, wherein the inner tube is moved to an extended position relative to an outer tube of the tube assembly to position the tube assembly in the second deployed position.

10. The vehicle system as recited in claim 1, wherein the tube assembly includes an outer tube, and the inner tube is configured to slide relative to the outer tube.

11. The vehicle system as recited in claim 10, wherein the inner tube is movable in a telescoping fashion within a passageway of the outer tube.

12. The vehicle system as recited in claim 1, wherein the hitch tube supports a bumper.

13. The vehicle system as recited in claim 1, wherein the deployable step system further includes a first activation button for deploying the deployable step system from the stowed position and a first deployed position, and the deployable step system further includes a second activation button for deploying the deployable step system from the first deployed position to a second deployed position.

14. The vehicle system as recited in claim 13, wherein the second activation button is configured to allow the inner tube to slide relative to an outer tube of the tube assembly.

15. The vehicle system as recited in claim 14, comprising a ball bearing that facilitates slidable moment of the inner tube relative to the outer tube of the tube assembly.

16. A vehicle system, comprising:
a hitch tube;
a deployable step system mounted to the hitch tube and movable between a stowed position and at least one deployed position,
wherein the deployable step system includes a tube assembly and a step pad mounted to the tube assembly; and
a strain gauge and a control module operably connected to the strain gauge, wherein the control module is programmed to command an alert in response to a signal from the strain gauge indicating that an amount of stress on the deployable step system exceeds a predefined threshold.

17. The vehicle system as recited in claim 1, comprising a sensor system operably connected to a control module, wherein the control module is programmed to command an audible alert in response to a signal from the sensor system indicating that a user is approaching the deployable step system.

18. A vehicle system, comprising:
a hitch tube; and
a deployable step system mounted to the hitch tube and including a tube assembly that is pivotable between a stowed position and a first deployed position,
wherein the tube assembly is parallel to a longitudinal axis of a bumper in the stowed position and is transverse to the longitudinal axis in the first deployed position,
wherein the tube assembly is movable from the first deployed position to a second deployed position,
wherein an inner tube is moved to an extended position relative to an outer tube of the tube assembly to position the tube assembly in the second deployed position.

* * * * *